(12) United States Patent
Barac et al.

(10) Patent No.: US 12,021,789 B2
(45) Date of Patent: Jun. 25, 2024

(54) METHOD FOR CENTRALIZING INTERFERENCE COORDINATION

(71) Applicant: TELEFONAKTIEBOLAGET LM ERICSSON (PUBL), Stockholm (SE)

(72) Inventors: Filip Barac, Huddinge (SE); Sebastian Faxér, Stockholm (SE); Nianshan Shi, Järfälla (SE); Mårten Sundberg, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 552 days.

(21) Appl. No.: 17/275,190

(22) PCT Filed: Sep. 10, 2019

(86) PCT No.: PCT/IB2019/057629
§ 371 (c)(1),
(2) Date: Mar. 10, 2021

(87) PCT Pub. No.: WO2020/053767
PCT Pub. Date: Mar. 19, 2020

(65) Prior Publication Data
US 2021/0328749 A1 Oct. 21, 2021

Related U.S. Application Data

(60) Provisional application No. 62/729,250, filed on Sep. 10, 2018.

(51) Int. Cl.
*H04L 5/00* (2006.01)
*H04W 72/541* (2023.01)

(52) U.S. Cl.
CPC .......... *H04L 5/0073* (2013.01); *H04L 5/0035* (2013.01); *H04L 5/0048* (2013.01); *H04W 72/541* (2023.01)

(58) Field of Classification Search
None
See application file for complete search history.

(56) References Cited

U.S. PATENT DOCUMENTS

2013/0322322 A1* 12/2013 Redana ............... H04W 52/244
370/315
2018/0234916 A1* 8/2018 Song ..................... H04W 48/18
(Continued)

OTHER PUBLICATIONS

3rd Generation Partnership Project; Technical Specification Group Radio Access Network; Evolved Universal Terrestrial Radio Access Network (E-UTRAN); X2 application protocol (X2AP) (Release 15), 3GPP TS 36.423 V15.2.0, Jun. 2018.
(Continued)

*Primary Examiner* — Hassan A Phillips
*Assistant Examiner* — Gautam Sharma
(74) *Attorney, Agent, or Firm* — ERICSSON INC.

(57) ABSTRACT

A method for interference coordination comprises receiving, from a first network node, a reference signal indicating that one or more second network nodes are experiencing interference. The reference signal indicates at least one identifier for the first network node and for the second network nodes. The method further comprises preparing a remote interference management (RIM) coordination message based on the reference signal, and sending, to the first network node, the RIM coordination message to be forwarded to the second network nodes. The method provides a communication between a central aggressor network node and a central victim network node to exchange reference signal and RIM coordination information. Furthermore, the central victim network node may pass the RIM coordination message to a group of victim network nodes indicated in the RIM coordination message.

18 Claims, 18 Drawing Sheets

(56) References Cited

U.S. PATENT DOCUMENTS

2020/0106589 A1* 4/2020 Xu .................. H04L 5/0073
2020/0107227 A1* 4/2020 Xu .................. H04J 11/0056
2021/0321417 A1* 10/2021 Kim ................. H04L 5/0048
2021/0328749 A1* 10/2021 Barac ............... H04L 5/0073

OTHER PUBLICATIONS

MCC Support, Draft Report of 3GPP TSG RAN WG1 #94 v0.1.0 (Gothenburg, Sweden, Aug. 20-24, 2018), 3GPP TSG RAN WG1 Meeting #94bis, Chengdu, China, Oct. 8-12, 2018.

CMCC, Discussion on RS design for RIM, R1-1808842, 3GPP TSG RAN WG1 Meeting #94, Gothenburg, Sweden,. Aug. 20-24, 2018.

3rd Generation Partnership Project; Technical Specification Group Services and System Aspects; System Architecture for the 5G System; Stage 2 (Release 16), 3GPP TS 23.501 V16.1.0 (Jun. 2019).

3rd Generation Partnership Project; Technical Specification Group Radio Access Network; NG-RAN; NG Application Protocol (NGAP) (Release 15), 3GPP TS 38.413 V15.3.0 (Mar. 2019).

* cited by examiner

METHOD FOR CENTRALIZING INTERFERENCE COORDINATION

This application is a 371 of International Application No. PCT/162019/057629, filed Sep. 10, 2019, which claims the benefit of U.S. Application No. 62/729,250, filed Sep. 10, 2018, the disclosures of which are fully incorporated herein by reference.

TECHNICAL FIELD

Particular embodiments relate to the field of interference coordination; and more specifically, to methods and apparatuses for a centralized interference coordination.

BACKGROUND

A 5G system comprises multiple function nodes. FIG. 1 illustrates an example 5G system architecture including the function nodes to carry out different network functions (NFs). The function nodes and their NFs are listed as followings:
(1) Access and Mobility Management function (AMF) supports: termination of non-access stratum (NAS) signaling, NAS ciphering and integrity protection, registration management, connection management, mobility management, access authentication and authorization, and security context management;
(2) Session Management function (SMF) supports: session management (e.g., session establishment, modification, and release), IP address allocation and management of user equipment (UE), functions of dynamic host configuration protocol (DHCP), termination of NAS signaling related to session management, downlink (DL) data notification, and traffic steering configuration for user plane function for proper traffic routing;
(3) User plane function (UPF) supports: packet routing and forwarding, packet inspection, and QoS handling which acts as external PDU session point of interconnect to Data Network (DN) and is an anchor point for intra- & inter-RAT mobility;
(4) Policy Control Function (PCF) supports: unified policy framework, providing policy rules to CP functions, and access subscription information for policy decisions in unified data repository (UDR);
(5) Authentication Server Function (AUSF) which acts as an authentication server;
(6) Unified Data Management (UDM) supports: generation of Authentication and Key Agreement (AKA) credentials, user identification handling, access authorization, and subscription management;
(7) Application Function (AF) supports: application influence on traffic routing, accessing network exposure function, and interaction with policy framework for policy control;
(8) Network Exposure function (NEF) supports: exposure of capabilities and events, secure provision of information from external application to 3GPP network, and translation of internal/external information;
(9) NF Repository function (NRF) supports: service discovery function which maintains NF profile and available NF instances; and
(10) Network Slice Selection Function (NSSF) supports: selecting of the network slice instances to serve the UE, determining the allowed network slice selection assistance information (NSSAI), and determining the AMF set to be used to serve the UE.

Considering interference protection in 5G system networks, wireless cellular networks are built up of cells, and each cell is defined by a certain coverage area of a radio base station (BS). The BSs communicate with terminals/UE in the network wirelessly. The communication is carried out in either paired or unpaired spectrum. In case of paired spectrum, the downlink (DL) and uplink (UL) directions are separated in frequency, called Frequency Division Duplex (FDD). In case of unpaired spectrum, the DL and UL use the same spectrum, called Time Division Duplex (TDD). As the name implies, the DL and UL are separated in the time domain, typically with guard periods (GP) between them. A guard period serves several purposes. Most essentially, the processing circuitry at the base station (BS) and UE needs sufficient time to switch between transmission and reception, however, this is typically a fast procedure and does not significantly contribute to the requirement of the guard period size. There is one guard period at a downlink-to-uplink switch and one guard period at an uplink-to-downlink switch, but since the guard period at the uplink-to-downlink switch only needs to give enough time to allow BS and UE to switch between reception and transmission, and consequently typically is small, it is for simplicity neglected in the following description. The guard period at the downlink-to-uplink switch, GP, however, must be sufficiently large to allow a UE to receive a time-delayed DL grant scheduling the UL and to transmit the UL signal with a proper timing advance, e.g., compensating for the propagation delay, such that it is received in the UL part of the frame at the BS. In practice, the guard period at the uplink-to-downlink switch is created with an offset to the timing advance. Thus, the GP should be larger than two times the propagation time towards a UE at the cell edge, otherwise, the UL and DL signals in the cell will interfere. Because of this, the GP is typically chosen to depend on the cell size, such that larger cells (i.e. larger inter-site distances) have a larger GP and vice versa.

Additionally, the guard period reduces DL-to-UL interference between BSs by allowing a certain propagation delay between cells without having the DL transmission of a first BS enter the UL reception of a second BS. In a macro network, the DL transmission power would be on the order of 20 dB larger than the UL transmission power, and the pathloss between BSs, perhaps above roof top and in line-of-sight (LOS), may often be much smaller than the pathloss between BSs and terminals in non-line-of-sight (NLOS). Hence, if the UL is interfered by the DL of other cells, so called cross-link interference, the UL performance can be seriously degraded. Because of the large transmit power discrepancy between UL and DL and/or propagation conditions, a cross-link interference can be detrimental to system performance, which is not only for the co-channel case where DL interferes UL on the same carrier, but also for the adjacent channel case where DL of one carrier interferes with UL on an adjacent carrier. Because of this, the TDD macro networks are typically operated in a synchronized and aligned fashion, where the symbol timing is aligned and a semi-static TDD UL/DL pattern is used. For example, the TDD UL/DL pattern is the same for all the cells in the networks. By aligning uplink and downlink periods so that they do not occur simultaneously, one proposal is to reduce interference between uplink and downlink. Typically, operators with adjacent TDD carriers also synchronize their TDD UL/DL patterns to avoid adjacent channel cross-link interference.

FIG. 2 illustrates a TDD guard period design. The principle of applying a GP, at the downlink-to-uplink switch, to avoid DL-to-UL interference between BSs is shown in FIG. 2. The TDD guard period design where a victim BS (V in FIG. 2) is being or at least potentially interfered by an aggressor BS (A in FIG. 2). The aggressor BS sends a DL signal to a device in its cell, and the DL signal also reaches the victim BS where the propagation loss is not enough to protect it from the signals of A. The victim BS is also trying to receive a signal from another terminal (not shown in the figure) in its cell. The signal has propagated a distance d and due to propagation delay, the experienced frame structure alignment of A at V is shifted/delayed τ second, proportional to the propagation distance d. As illustrated in FIG. 2, although the DL part of the aggressor BS (A) is delayed, it does not enter the UL region of the victim BS (V) due to the guard period used. The guard period design for this TDD system serves the purpose to avoid interference between the BSs. In addition, the aggressor DL signal undergoes attenuation, but may be very high relative to the received victim UL signal, due to differences in transmit powers in terminals and base stations as well as propagation condition differences for base station-to-base station links and terminal-to-base station links. The terminology of victim and aggressor is only used here to illustrate why typical TDD systems are designed as they are. The victim can also act as an aggressor and vice versa and even simultaneously since channel reciprocity exists between the BSs.

For new radio (NR) frame structure in the RAT next generation mobile wireless communication system (i.e., 5G) or NR, the RAT supports a diverse set of use cases and a diverse set of deployment scenarios. The diverse set of deployment scenarios includes deployment at both low frequencies (e.g., 100s of MHz) and very high frequencies (e.g., mm waves in the tens of GHz).

Similar to LTE, NR uses orthogonal frequency division multiplexing (OFDM) in the downlink from a network node, such as gNB, eNB, or base station, to a user equipment (UE). The basic NR physical resource over an antenna port can thus be seen as a time-frequency grid as illustrated in FIG. 3, where a resource block (RB) in a 14-symbol slot is shown. A resource block corresponds to twelve contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15\times 2^{\alpha})$ kHz, where $\alpha \in (0, 1, 2, 3, 4)$. $\Delta f$ being 15 kHz is the basic (or reference) subcarrier spacing that is also used in LTE.

FIG. 3 illustrates an example NR physical resource grid. In the time domain, downlink and uplink transmissions in NR will be organized into equally-sized subframes of 1 ms each, similar to LTE. A subframe is further divided into multiple slots of equal duration. The slot length for subcarrier spacing $\Delta f=(15\times 2^{\alpha})$ kHz is $\frac{1}{2^{\alpha}}$ ms. There is only one slot per subframe at $\Delta f=15$ kHz and a slot consists of 14 OFDM symbols.

Downlink transmissions are dynamically scheduled, i.e., in each slot the gNB transmits downlink control information (DCI) about which UE data is to be transmitted to and which resource blocks in the current downlink slot the data is transmitted on. This control information is typically transmitted in the first one or two OFDM symbols in each slot in NR. The control information is carried on the Physical Control Channel (PDCCH), and the data is carried on the Physical Downlink Shared Channel (PDSCH). A UE first detects and decodes PDCCH and if a PDCCH is decoded successfully, it then decodes the corresponding PDSCH based on the decoded control information in the PDCCH.

In addition to PDCCH and PDSCH, there are also other channels and reference signals transmitted in the downlink. Uplink data transmissions, carried on Physical Uplink Shared Channel (PUSCH), are also dynamically scheduled by the gNB by transmitting a DCI. In case of TDD operation, the DCI transmitted in the DL region always indicates a scheduling offset, so that the PUSCH is transmitted in a slot in the UL region.

Regarding UL-DL configurations in TDD, some subframes/slots are allocated for uplink transmissions, and some subframes/slots are allocated for downlink transmissions. The switch between downlink and uplink occurs in the special subframes (LTE) or flexible slots (NR). In LTE, seven different UL-DL configurations are provided, see Table 1.

TABLE 1

LTE uplink-downlink configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The size of the guard period can also be configured from a set of possible selections. Furthermore, the number of symbols for downlink transmission in a special subframe (DwPTS) and uplink transmission in a special subframe in the special subframe (UpPTS) can also be configured.

NR, on the other hand, provides many different uplink-downlink configurations. There are 10 to 320 slots per radio frame, where each radio frame has a duration of 10 ms, depending on subcarrier spacing. In Table 2, the OFDM symbols in a slot are classified as 'downlink' (denoted 'D'), 'flexible' (denoted 'X'), or 'uplink' (denoted 'U'). A semi-static TDD UL-DL configuration may be used, where the TDD configuration is RRC configured using the IE TDD-UL-DL-ConfigCommon.

TABLE 2

IE of TDD-UL-DL-ConfigCommon

TDD-UL-DL-ConfigCommon ::= SEQUENCE {
 -- Reference SCS used to determine the time domain boundaries in the UL-DL pattern
which must be common across all subcarrier specific
 -- virtual carriers, i.e., independent of the actual subcarrier spacing using for TABLE 2-continued IE of TDD-UL-DL-ConfigCommon

```
data transmission.
   -- Only the values 15 or 30 kHz (<6GHz), 60 or 120 kHz (>6GHz) are applicable.
   -- Corresponds to L1 parameter 'reference-SCS' (see 38.211, section FFS_Section)
   referenceSubcarrierSpacing        SubcarrierSpacing
                     OPTIONAL,
   -- Periodicity of the DL-UL pattern. Corresponds to L1 parameter 'DL-UL-
transmission-periodicity' (see 38.211, section FFS_Section)
   dl-UL-TransmissionPeriodicity    ENUMERATED {ms0p5, ms0p625, ms1, ms1p25, ms2,
ms2p5, ms5, ms10}           OPTIONAL,
   -- Number of consecutive full DL slots at the beginning of each DL-UL pattern.
   -- Corresponds to L1 parameter 'number-of-DL-slots' (see 38.211, Table 4.3.2-1)
   nrofDownlinkSlots          INTEGER (0..maxNrofSlots)
                     OPTIONAL,
   -- Number of consecutive DL symbols in the beginning of the slot following the
last full DL slot (as derived from nrofDownlinkSlots).
   -- If the field is absent or released, there is no partial-downlink slot.
   -- Corresponds to L1 parameter 'number-of-DL-symbols-common' (see 38.211, section
FFS_Section).
   nrofDownlinkSymbols            INTEGER (0..maxNrofSymbols-1)
                     OPTIONAL, -- Need R
   -- Number of consecutive full UL slots at the end of each DL-UL pattern.
   -- Corresponds to L1 parameter 'number-of-UL-slots' (see 38.211, Table 4.3.2-1)
   nrofUplinkSlots               INTEGER (0..maxNrofSlots)
                     OPTIONAL,
   -- Number of consecutive UL symbols in the end of the slot preceding the first
full UL slot (as derived from nrofUplinkSlots).
   -- If the field is absent or released, there is no partial-uplink slot.
   -- Corresponds to L1 parameter 'number-of-UL-symbols-common' (see 38.211, section
FFS_Section)
   nrofUplinkSymbols          INTEGER (0..maxNrofSymbols-1)
                     OPTIONAL -- Need R
```

Or alternatively, the slot format can be dynamically indicated with a Slot Format Indicator (SFI) conveyed with DCI Format 2_0. Regardless, if dynamic or semi-static TDD configuration is used in NR, the number of UL and DL slots, as well as the guard period may be almost arbitrarily configured within the TDD periodicity. In addition, because of the guard period being configured, the number of UL and DL symbols in the flexible slot(s) is also configured. This allows for flexible uplink-downlink configurations.

For an atmospheric ducting used in certain weather conditions and in certain regions of the world, a ducting phenomenon can happen in the atmosphere. The appearance of the duct is dependent on, for example, temperature and humidity, and when the atmospheric ducting appears, it can "channel" the signal to help it propagate a significantly longer distance than if the duct was not present. An atmospheric duct is a layer in which rapid decrease in the refractivity of the lower atmosphere, e.g., the troposphere, occurs. In this way, atmospheric ducts can trap the propagating signals in the ducting layer, instead of radiating out in space. Thus, most of the signal energy propagates in ducting layer which acts as a wave guide. Therefore, trapped signals can propagate through beyond-line-of-sight distances with relatively low path loss, sometimes even lower than in LOS propagation. A ducting event is typically temporary and can have a time duration from a couple of minutes to several hours. When the ducting event occurs, a BS can be interfered by thousands of BS, and a single BS can interfere thousands of BSs. Potential coordination between the aggressor BS and a large number of victim BSs would incur a significant backhaul signaling load and would not scale.

There currently exist certain challenges. The existing challenges are how to enable coordination, over backhaul, between an aggressor BS and a large number of victim BSs in a remote interference scenario, without incurring a large signaling load on the backhaul. A new design to coordinate the interference between the aggressor BSs and the victim BSs is required.

SUMMARY

To address the foregoing problems with existing solutions, disclosed are a method and a network node, to enable remote interference management (RIM) coordination information exchange between an aggressor base station and a group of victim base stations over backhaul. The present disclosure implements a solution to solve a remote interference occurred in the current time division duplex (TDD) system and a presence of an atmospheric duct by allowing a network node to act as a central unit to handle RIM-related messages for a group of network nodes. Furthermore, by signaling the RIM-related messages only between the central units, the method and the network node disclosed herein may avoid a large signaling load on the backhaul, and therefore, can be scalable in the system and improves the preference of the network.

Several embodiments are elaborated in this disclosure. According to one embodiment of a method for interference coordination, the method comprises receiving, from a first network node, a reference signal indicating that one or more second network nodes are experiencing interference. The reference signal indicates at least one identifier for the first network node and the one or more second network nodes. The method further comprises preparing a remote interference management (RIM) coordination message based on the reference signal. The method additionally comprises sending, to the first network node, the RIM coordination message to be forwarded to the one or more second network nodes.

In one embodiment, the first network node is a central unit and the one or more second network nodes are a group of distributed units.

In one embodiment, the first network node is an Access and Mobility Management Function (AMF) node.

In one embodiment, the sending step comprises establishing a connection with the first network node, sending the RIM coordination message to the first network node over backhaul; and forwarding the RIM coordination message to the one or more second network nodes via a Xn interface. In a particular embodiment, the connection is a route via an intermediate network node in a core network.

In one embodiment, the preparing step comprises transmitting, to a third network node, the RIM coordination message over backhaul, aggregating, at the third network node, the RIM coordination message transmitted over backhaul, and identifying, at the third network node, a first identifier for the first network node and a second identifier for the one or more second network nodes based on the reference signal. In one embodiment, the first identifier and the second identifier may be included in the RIM coordination message aggregated at the third network node.

In one embodiment, the identifying step comprises retrieving, at the third network node, mapping information from a database in a core network, wherein the mapping information comprises a mapping between the first identifier and the second identifier. In a particular embodiment, the third network node is an AMF node.

In one embodiment, the first identifier for the first network node is an AMF ID, an AMF set ID, an AMF region ID, or a preconfigured index which indicates the first network node.

In one embodiment, the second identifier for the one or more second network nodes is a reference signal group (RSG) ID which identifies an individual network node or a group of network nodes associated with the first network node associated with the first identifier.

According to an embodiment of a network node for interference coordination, the network node comprises at least one processing circuitry, and at least one storage that stores processor-executable instructions, when executed by the processing circuitry, causes a network node to receive, from a first network node, a reference signal indicating that one or more second network nodes are experiencing interference. The reference signal indicates at least one identifier for the first network node and for the one or more second network nodes. The network node further prepares a remote interference management (RIM) coordination message based on the reference signal. The network node additionally sends, to the first network node, the RIM coordination message to be forwarded to the one or more second network nodes.

Certain aspects of the present disclosure and their embodiments may provide solutions to these or other challenges. There are, proposed herein, various embodiments which address one or more of the issues disclosed herein.

Certain embodiments may provide one or more of the following technical advantages. The methods disclosed in the present disclosure may provide an efficient and scalable solution for communication system to allow RIM-related messages exchange between an aggressor master network node and a victim master network node, such that the aggressor master network node avoids a direct communication to all victim network nodes. Therefore, particular embodiments may be scalable in the system and reduce a large signaling in the network efficiently, and further improve the performance of the network.

Various other features and advantages will become obvious to one of ordinary skill in the art in light of the following detailed description and drawings. Certain embodiments may have none, some, or all of the recited advantages.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
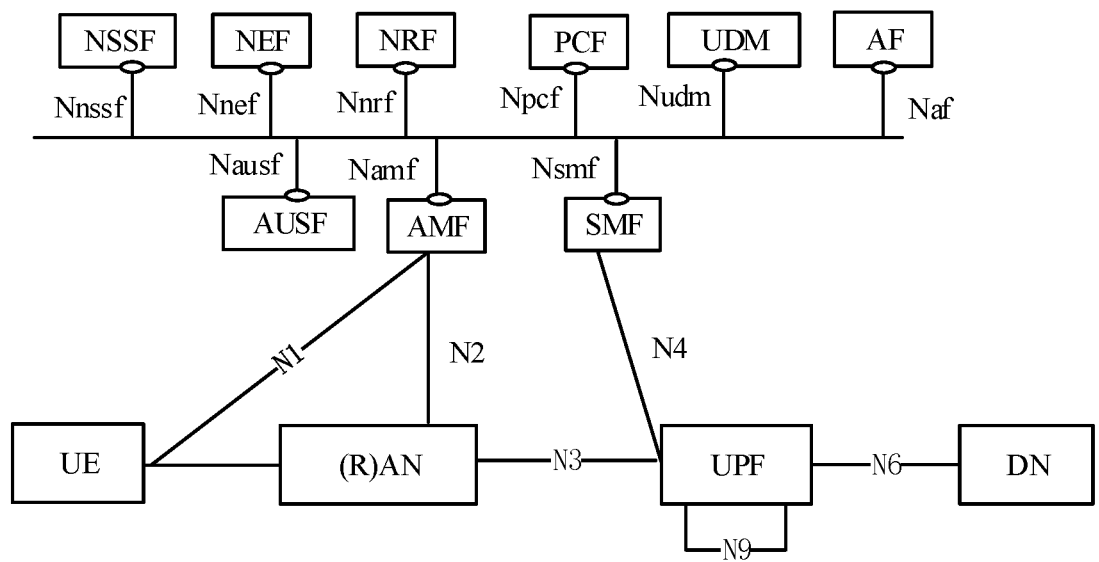
FIG. 1 illustrates a block diagram of an example 5G system architecture.
Figure 2:
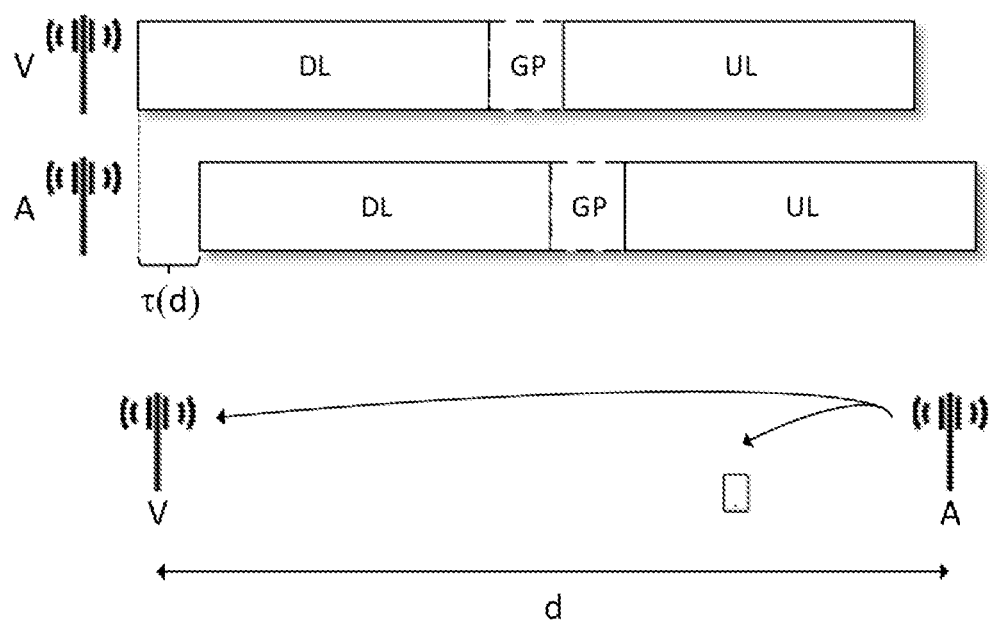
FIG. 2 illustrates a diagram of a time division duplex (TDD) guard design in 5G system architecture.
Figure 3:
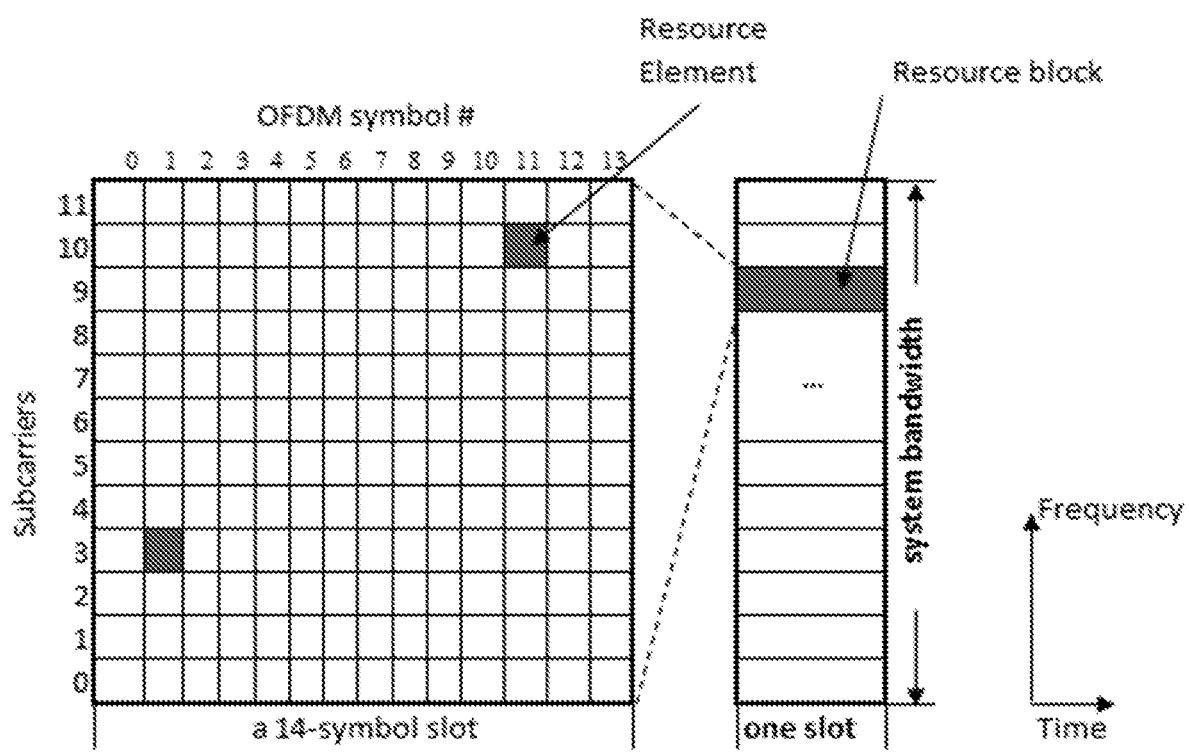
FIG. 3 illustrates a diagram of an example NR physical resource grid.

Current guard period design for Time Division Duplex (TDD) in 5G communication network causes interferences and delays in signaling between base stations. Furthermore, a presence of atmospheric ducting also causes downlink interferences to a victim base station by an aggressor base station in the distance. Therefore, the interferences can be extensive. However, existing methods to such interferences incur a large signaling load on the backhaul and cannot be scalable. Particular embodiments of the present disclosure provide a central network node to coordinate remote interferences for a group of network nodes which associate with the central network node. Therefore, particular embodiments of the present disclosure may avoid a large amount of direct communications with each victim network node, which reduces a waste on the resource in the network.

Furthermore, both of the victim network nodes and the aggressor network nodes may have their own central network nodes respectively, e.g., a central victim network node and a central aggressor network node, such that a remote interference management (RIM) coordination message can be exchanged between the central victim network node and the central aggressor network node via the backhaul, and the RIM coordination message would then be forwarded to their respective groups of network nodes. Therefore, particular embodiments of the present disclosure may be scalable for a broad range of interference, and furthermore, improve the performance of the network.

In particular embodiments of the present disclosure, the central victim network node and the central aggressor network node may be a gNB central unit (CU). The gNB CU collects and merges each RIM coordination information sent from a group of distributed units (DUs) that the gNB CU is in charge of, and then forwards a merged RIM coordination message to another gNB CU. For example, an aggressor gNB CU exchanges a merged RIM coordination message, which is merged based on RIM coordination information received from the DUs, with a victim gNB CU. Furthermore, the victim gNB CU may distribute the merged RIM coordination message to relevant gNB DUs, such as the gNB DU identified in the merged RIM coordination message.

In the present disclosure, a network node may be referred to as a base station. The base station is a general term and can correspond to any type of radio network node or any network node, which communicates with a UE and/or with another network node. Examples of network nodes are NodeB, base station (BS), multi-standard radio (MSR) radio node, such as MSR BS, eNB, gNB. MeNB, SeNB, network controller, radio network controller (RNC), core network node (AMF, MME, MSC etc.), base station controller (BSC), road side unit (RSU), relay, donor node controlling relay, base transceiver station (BTS), access point (AP), transmission points, transmission nodes, RRU, RRH, nodes in distributed antenna system (DAS), O&M, OSS, SON, positioning node (e.g. E-SMLC) etc.

The term radio access technology, or RAT, may refer to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term reference signal used herein can be any physical signal or physical channel. Examples of downlink reference signals are PSS, SSS, CRS, PRS, CSI-RS, DMRS, NRS, NPSS, NSSS, SS, MBSFN RS etc. Examples of uplink reference signals are SRS, DMRS etc.

Figure 4:
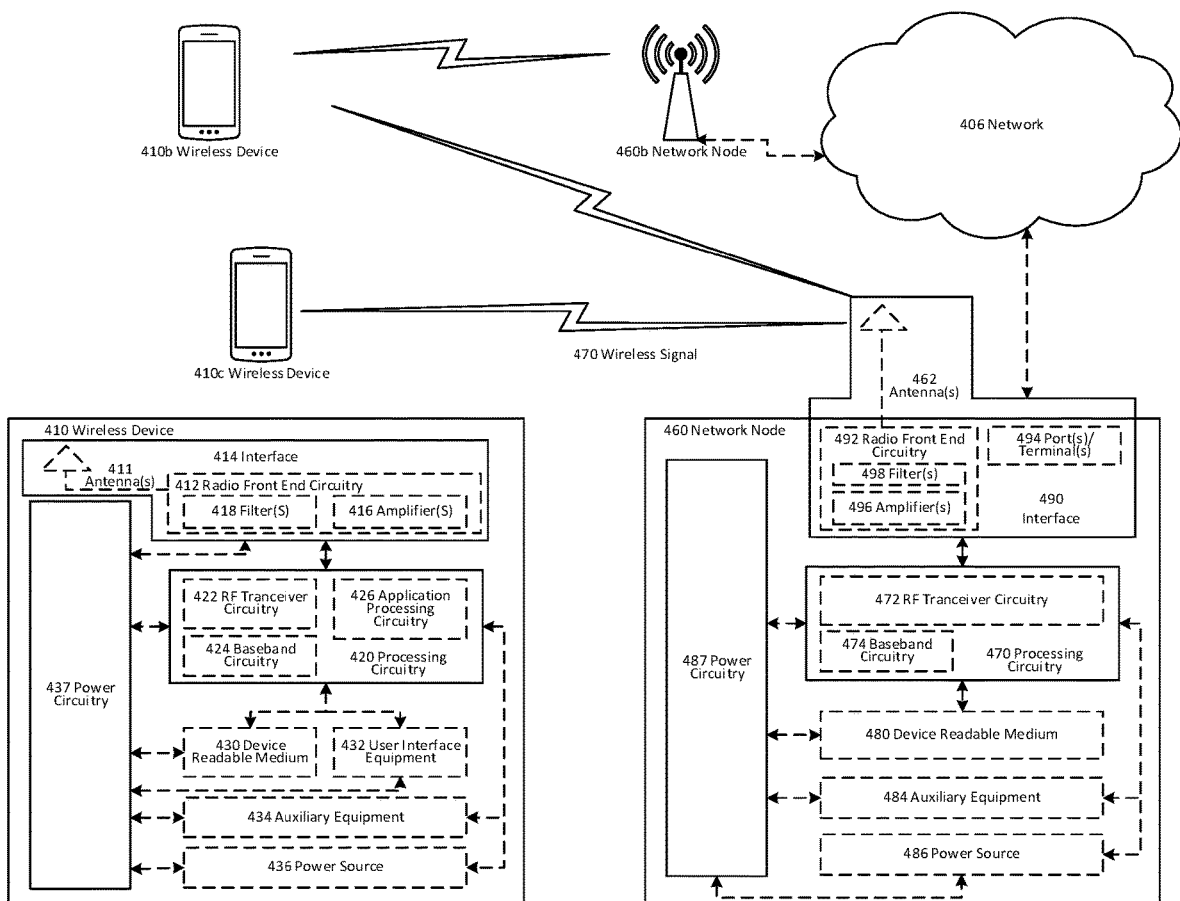
FIG. 4 illustrates an example wireless network, according to certain embodiments.

FIG. 4 is an example wireless network, in accordance with certain embodiments. Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 406, network nodes 460 and 460b, and wireless devices (WDs) 410, 410b, and 410c. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. In some embodiments, the network node 460 may be a base station, such as an eNB. In the present disclosure, the term eNB may be used to refer to both an eNB and a ng-eNB unless there is a specific need to distinguish between the two. In certain embodiments, the network node 460 may be a network node, which is further illustrated in FIG. 18. In certain embodiments, the network node 460 may be a source network node. In certain embodiments, the network node 460 may be a target network node. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 460 includes processing circuitry 470, device readable medium 480, interface 490, auxiliary equipment 488, power source 486, power circuitry 487, and antenna 462. Although network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. In particular embodiments, the processing circuitry 470 of the network node 460 may perform a method which is further illustrated in FIG. 17. The benefits provided by such functionality are not limited to processing circuitry 470 alone or to other components of network node 460 but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signaling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 4 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, WiFi, WiMAX, or Bluetooth wireless technologies, just to mention a few. These wireless technologies may be integrated into the same or different chips or set of chips as other components within WD 410.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420, and is configured to condition signals communicated between antenna 411 and processing circuitry 420. Radio front end circuitry 412 may be coupled to or a part of antenna 411. In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable medium 430, WD 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein. In particular embodiments, the processing circuitry 420 of the WD 410 may execute instructions to perform measurements for certain cells in the network 406, which is further illustrated below.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionalities described herein as being performed by a WD may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into WD 410, and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment 432, WD 410 may communicate with end users and/or the wireless network, and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

Figure 5:
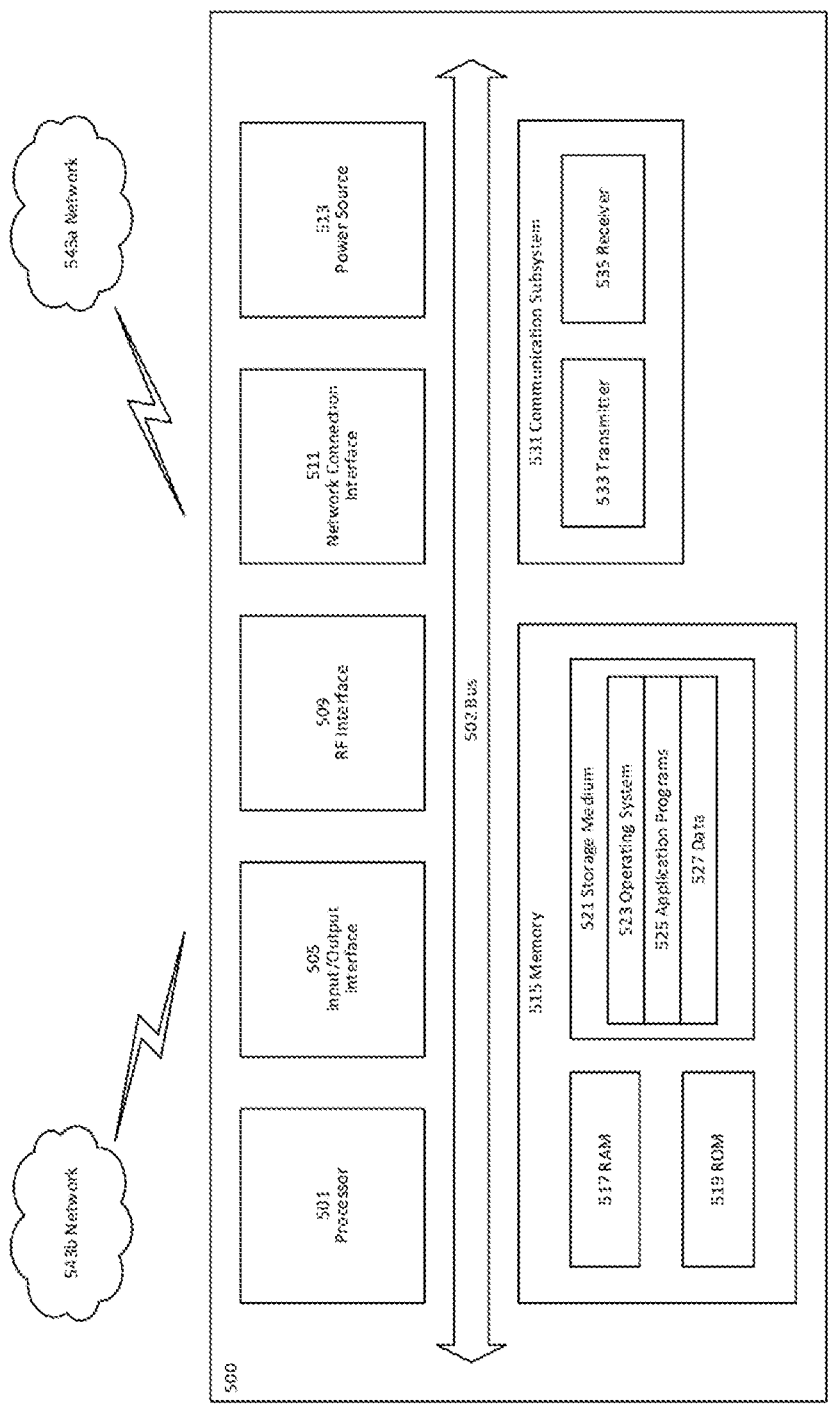
FIG. 5 illustrates an example user equipment, according to certain embodiments.

FIG. 5 illustrates one embodiment of a UE, in accordance with certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 400 may be any UE identified by the 3rd Generation Partnership Project (3GPP), including a NB-IoT UE, a MTC UE, and/or an enhanced MTC (eMTC) UE. UE 500, as illustrated in FIG. 5, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer. In certain embodiment, processing circuitry 501 may perform a method which is further illustrated in FIG. 17.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 5, processing circuitry 501 may be configured to communicate with network 543b using communication subsystem 531. Network 543a and network 543b may be the same network or networks or different network or networks. Communication subsystem 531 may be configured to include one or more transceivers used to communicate with network 543b. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543b may encompass wired and/or wireless networks such as a local-area network (LAN), a wide-area network (WAN), a computer network, a wireless network, a telecommunications network, another like network or any combination thereof. For example, network 543*b* may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 6:
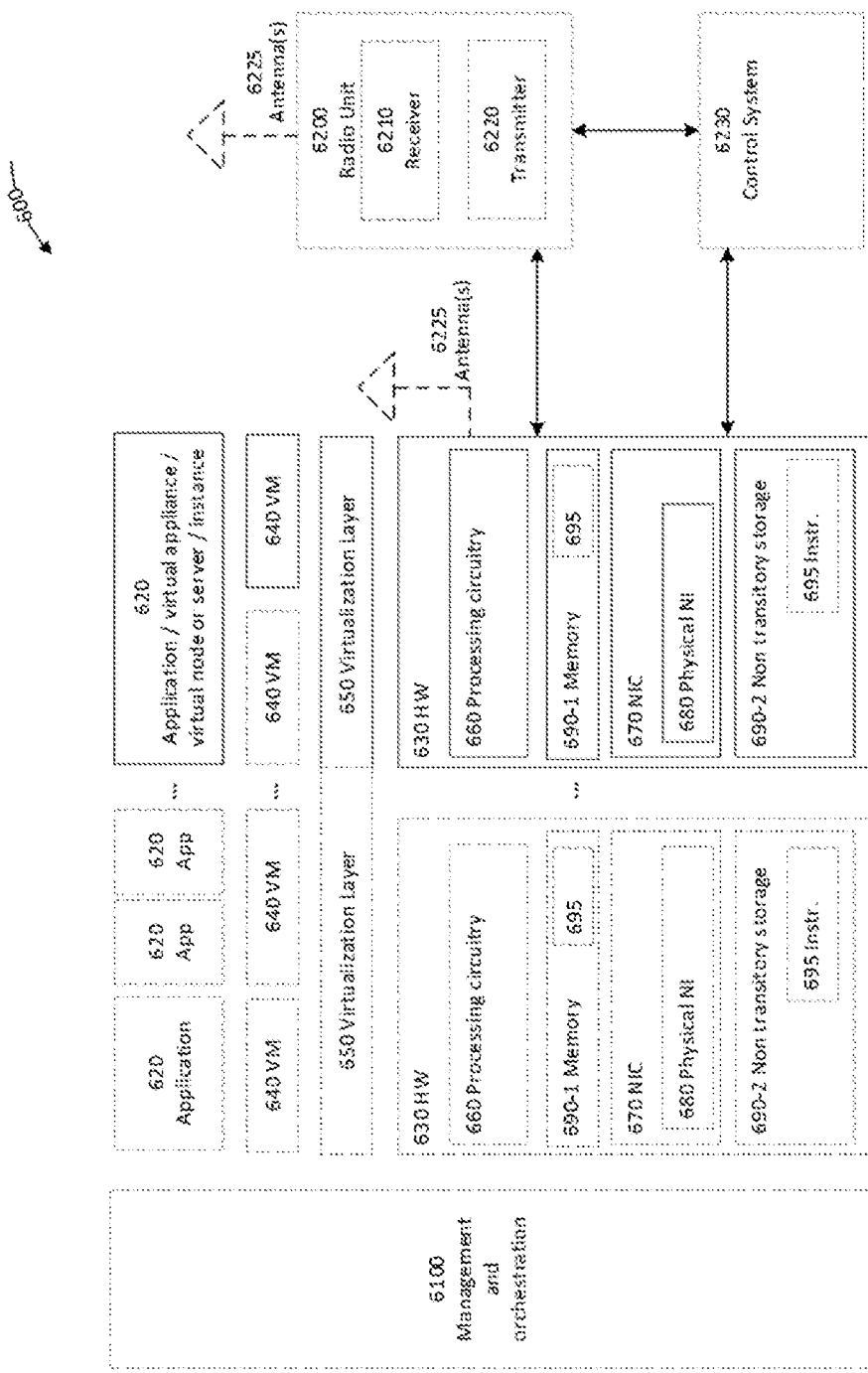
FIG. 6 illustrates an example virtualization environment, according to certain embodiments.

FIG. 6 illustrates an example virtualization environment, in accordance with certain embodiments. FIG. 6 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf (COTS) processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers (NICs) 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor (VMM). Virtualization layer 650 may present a virtual operating platform that appears like networking hardware to virtual machine 640.

As shown in FIG. 6, hardware 630 may be a standalone network node with generic or specific components. Hardware 630 may comprise antenna 6225 and may implement some functions via virtualization. Alternatively, hardware 630 may be part of a larger cluster of hardware (e.g. such as in a data center or customer premise equipment (CPE)) where many hardware nodes work together and are managed via management and orchestration (MANO) 6100, which, among others, oversees lifecycle management of applications 620.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements (VNE).

Still in the context of NFV, Virtual Network Function (VNF) is responsible for handling specific network functions that run in one or more virtual machines 640 on top of hardware networking infrastructure 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signaling can be affected with the use of control system 6230 which may alternatively be used for communication between the hardware nodes 630 and radio units 6200.

Figure 7:
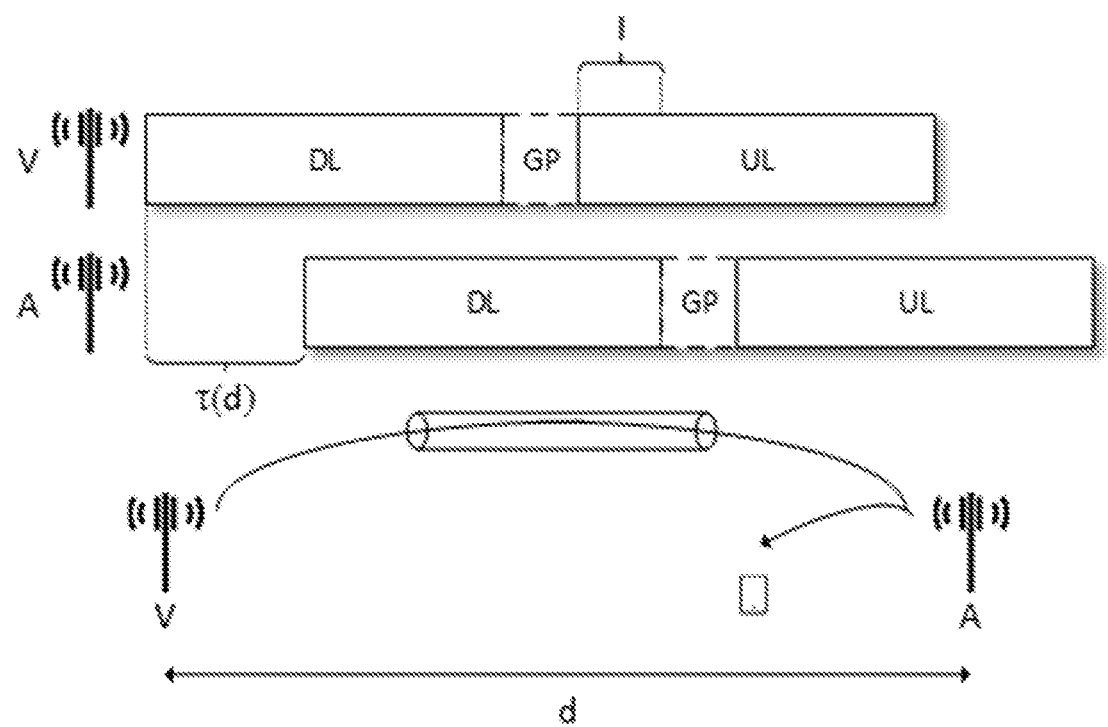
FIG. 7 illustrates a diagram of an example TDD guard period design in 5G system architecture, according to certain embodiments.

FIG. 7 illustrates an example DL interference from an aggressor BS into an UL region of a victim BS with a presence of an atmospheric duct, in accordance with certain embodiments. Due to the inherent properties of the TDD system design and the presence of the atmospheric duct, the distance d between the aggressor BS A that interferes with the victim BS V can be large. Ducting has typically been considered in design of cellular systems using paired spectrum. Consequently, a DL transmission would suddenly enter the UL region as interference I, as illustrated in FIG. 7.

For detecting interference between BSs, the victim BS, i.e. a BS that has detected it is being interfered due to the atmospheric ducting, sends a specific reference signal (RS) that can be detected by the aggressor BS. The aggressor BS can then adapt its transmission to avoid the interference situation. Such adaptation is to, for example, blank, or reduce the duration of its downlink transmission, effectively increasing the guard period.

In some embodiments, the aggressor BS uses backhaul signaling to inform the victim BS(s) that it has received the RS. In some embodiments, the victim BS(s) transmit, via backhaul, some assistance information to the aggressor BS. In some embodiments, the aggressor BS explicitly informs the victim BS(s), via backhaul, that the RS from the victim BS(s) is no longer being received.

In some embodiments, a central network node enables an exchange of RIM coordination information over the backhaul for a large number of victim BSs in a remote interference scenario.

To mitigate the remote interference, i.e., DL-to-UL interference, occurring due to the ducting events in TDD macro deployments, remote interference management is utilized. For instance, the aggressor BS may increase its GP, and thereby reduce the number of DL symbols in its cell. While this reduces DL capacity in the aggressor cell, it may reduce the UL interference level in the victim cell and therefore be beneficial to the overall network performance. As such a measurement mutes resources in one cell to protect resources in another cell, it is crucial to only apply the mechanism when the remote BS aggressor is actually causing interference to the victim, i.e. when a tropospheric ducting event occurs. Thus, the potential aggressor BS needs to be made aware of that it is causing interference to a potential victim BS in order to know when to apply the remote interference mitigation mechanism.

In some embodiments for remote interference mitigation, the victim BS of remote interference transmits a RS in certain time locations in order to make aggressor BS(s) aware that they are causing interference to the victim BS. Since the propagation channel is reciprocal in TDD systems, the aggressor BS would receive the RS at the same signal strength as the victim BS receives the aggressor BS's interfering signal, given that the same Tx power and Tx/Rx antenna patterns are used for both transmissions. A potential aggressor BS would then monitor certain time locations for the RSs transmitted by potential victim BSs, and upon detection of an RS sequence, it would infer that it is causing remote interference to a certain victim BSs, whereon it may apply a remote interference mitigation mechanism. Such an RS is typically transmitted by the victim BS at the end of the DL region which is right before the GP, and the potential aggressor BS monitors the start of the UL region which is right after the GP for the transmitted RSs.

In some embodiments from the aspect of an aggressor BS, the aggressor BS receives a RS. Based on the information received in the RS, the aggressor BS first learns that it is causing interference to a group of victim BSs, belonging to the same reference signal group (RSG). The RSG may comprise one or more victim BSs. In some embodiments, the RS may also convey information about the identifier of the core network node in charge of mobility management (e.g., MM node) of the victim BS(s). The aggressor BS's MM node establishes a connection to the victim BSs' MM node, which, in turn distributes the RIM coordination message to its affiliated BSs that are victimized by the aggressor BS. In some embodiments, a management node of the aggressor BS may not be in the core network. In some embodiments, the management node of the aggressor/victim BS may be a central unit, and the other aggressor/victim BSs may be distributed units associated with the central unit.

In some embodiments from the aspect of a victim BS, the MM node affiliated to the victim RSG aggregates RIM coordination information received from each individual victim BS, and then sends the aggregate RIM coordination information to the aggressor BS. In particular embodiments, one BS among the victim BSs may act as a "master BS" which receives the RIM coordination message from the core network, distributes the information to the other BSs under its supervision, collects and aggregates the RIM coordination information in response, and then transmits back the aggregated response to the core network when needed. This master BS may also control how the other BSs are sending the RS. In some embodiments, the master BS may be a master victim BS and/or a master aggressor BS, as shown in FIG. 8.

Figure 8:
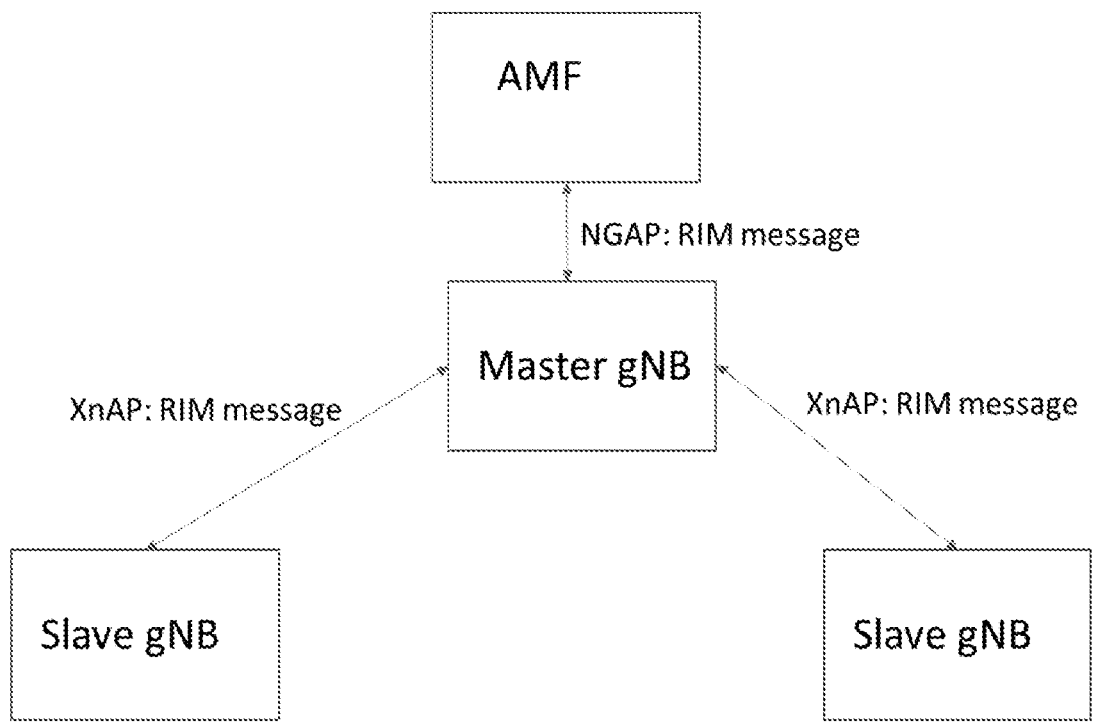
FIG. 8 illustrates a block diagram of an example method for coordinating interference with a master network node, according to certain embodiments.

FIG. 8 illustrates an example embodiment where one gNB is acting as a master gNB to handle the RIM related messages, in accordance with certain embodiments. The master gNB may be a master victim gNB or a master aggressor gNB, for example, based on a dynamic network performance. For example, the aggressor BS coordinates with a large number of victim BSs without incurring a large signaling load on the backhaul. A master BS avoids incurring a large RIM coordination signaling load on the backhaul by using a centralized mechanism to distribute RIM coordination information between the BSs involved in remote interference, where the need for aggressor BS to establish a direct backhaul connection with every individual victim BS is avoided.

For the RIM coordination information exchange presented on non-limiting examples of NG-RAN and NGC, where gNB is taken as an example of BS and AMF is an example of the MM node, from the aspect of aggressor BS, at step 1, an aggressor gNB first learns from a RS received over the air interface that it is causing interference to one or more victim gNBs belonging to the same RSG. By detecting the RS sequence, the aggressor gNB learns the RSG identifier of the victim RSG, as well as the identifier of the AMF of the victim gNB(s).

At step 2, the aggressor gNB then transmits, over the backhaul, a RIM coordination message destined to the aggressor AMF. The RIM coordination message contains, among other information, the identifier(s) of the victim AMF and/or the identifier(s) of victim gNB(s) or gNB groups (e.g., the gNBs belonging to the same RSG identifies a gNB group). The RIM coordination message first reaches the aggressor's AMF. In some embodiments, if the identifiers to the victim nodes (AMF, gNBs) are not explicitly signaled, the information may be provided for the aggressor's AMF to retrieve the needed information to reach the victim nodes (e.g. the victim AMF).

At step 3, based on the victim AMF identifier(s), the aggressor's AMF establishes a path to the victim AMF(s) and passes to the victim AMF the RIM coordination message. In some embodiment, if a direct path is not established, the message may be routed, through intermediate core network node(s), from the aggressor's AMF to the victims' AMF.

At step 4, upon reception of the RIM coordination message, the victim AMF determines, based on its available information, which of its connected victim gNBs belong to the RSG indicated in the RIM coordination message.

At step 5, the victims' AMF then passes the RIM coordination message to the victim gNB(s) or the victim gNB group (i.e., victim gNBs belonging to the RSG) indicated in the RIM coordination message. In particular embodiments where a master victim gNB is defined, the RIM coordination message is only sent to the master victim gNB. The master victim gNB further sends the RIM coordination message to the other gNBs (e.g., slave victim gNBs) via Xn interface.

Furthermore, for RIM coordination information exchange illustrated from the aspect of victim BS, at step 6, the victim gNBs send their respective RIM coordination messages to the victims' AMF.

At step 7, the victims' AMF collects the RIM coordination messages including RIM information from the victim gNBs, and, based on the RIM information, assembles an aggregate RIM coordination message.

At step 8, the aggregate RIM coordination message is signaled back to the aggressor's AMF from the victims' AMF. The aggressor's AMF passes this information to the aggressor gNB or the aggressor gNB group (e.g., aggressor gNBs belonging to the same RSG). In some embodiments, the RSG may include a big set of gNBs. In some embodiments, the RSG may include a single gNB.

The full set of steps (e.g., steps 1 to 9) in the RIM coordination information exchange need not necessarily be followed. For example, if only backhaul signaling between an aggressor gNB and a group of receiving victim gNBs is carried out, only steps 1 to 5 are used. In some embodiments, the functionality described in the core network need not be carried out by AMF, but could also, for example, be carried out by a newly defined node, solely defined for remote interference mitigation purposes.

Figure 9:
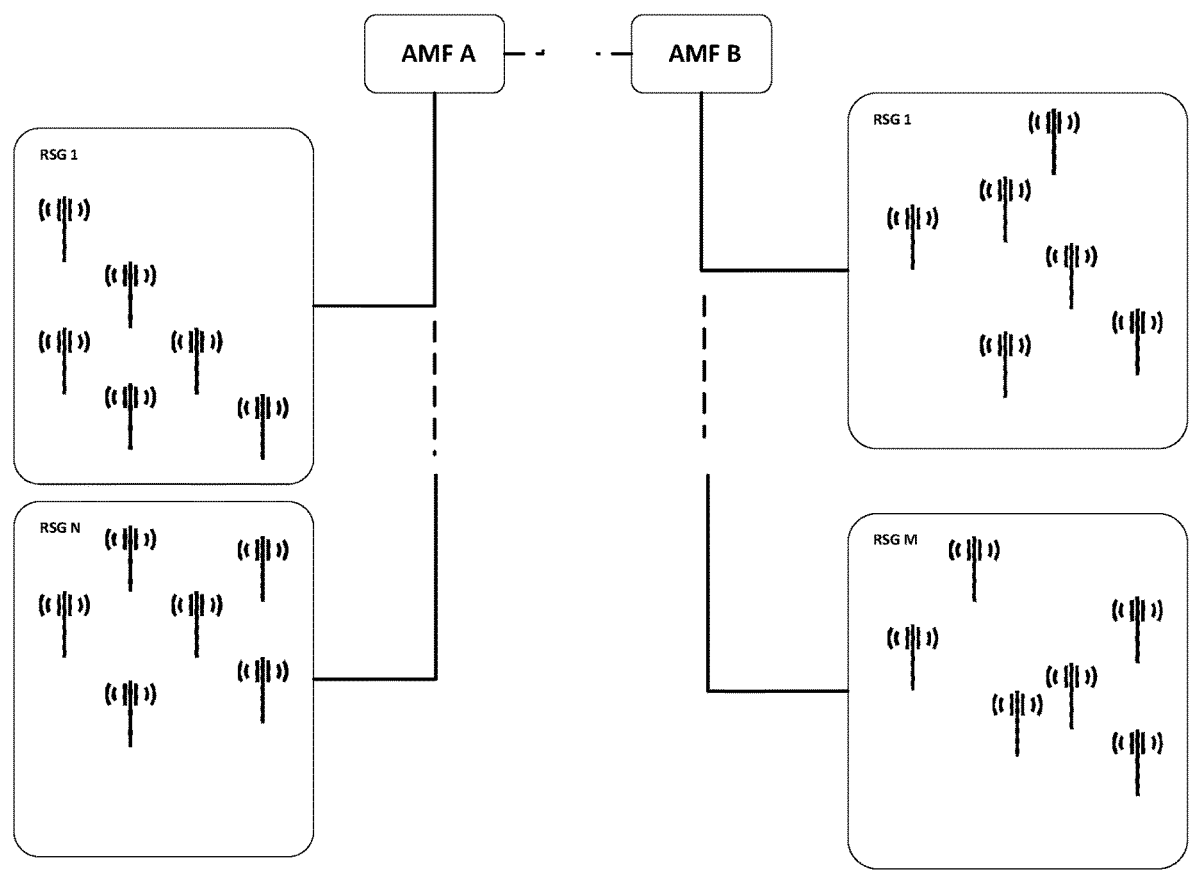
FIG. 9 illustrates a block diagram of an example method for signaling between aggressor BSs and victim BSs, according to certain embodiments.

FIG. 9 illustrates an example network set, in accordance with certain embodiments. The network architecture shown in FIG. 9 illustrates a signaling between an AMF A and an AMF B. The AMF A associates with multiple RSGs, for example, from RSG 1 to RSG N, and each RSG comprises one or more BSs. Likewise, the AMF B associates with one or more RSGs (e.g., RSG 1 to RSG M), and each RSG comprises one or more BSs.

Figure 10:
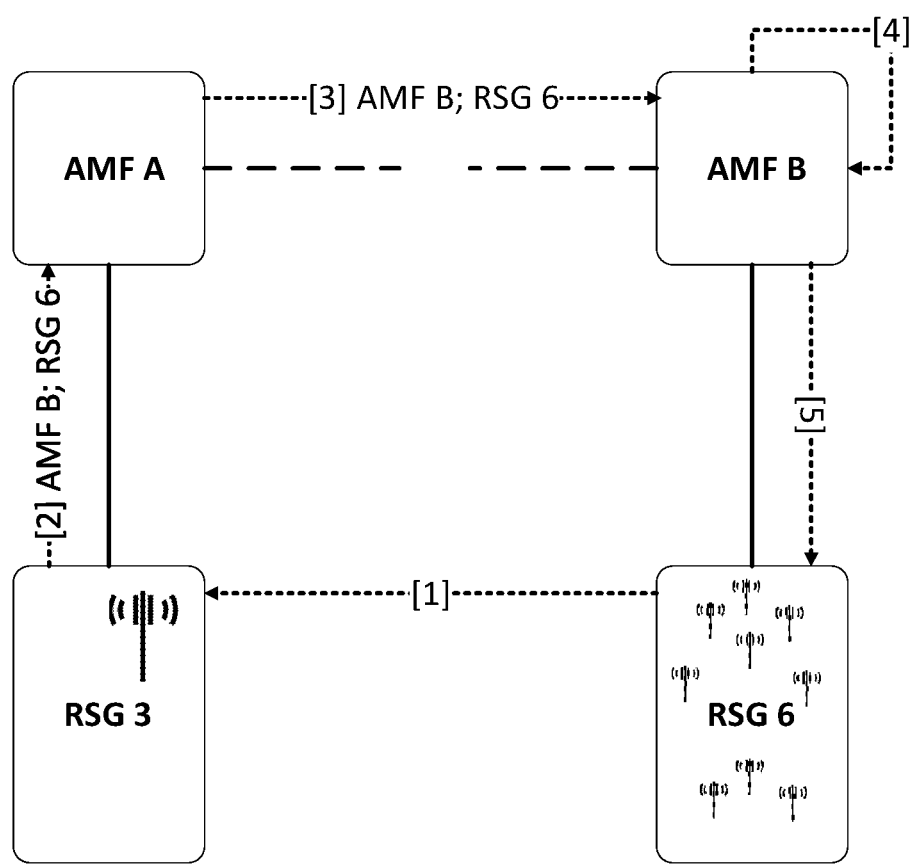
FIG. 10 illustrates a block diagram of an example method for signaling between two master network nodes, according to certain embodiments.

FIG. 10 illustrate an example signaling from an aggressor AMF to a victim AMF, in accordance with certain embodiments. The signaling in steps 1 to 5 are as shown in FIG. 10. Only the concerned/interfered RSGs (e.g., RSG 3 and RSG 6) are kept in FIG. 10.

In some embodiments, the victim gNBs inform their AMF that they are being interfered by an aggressor gNB. The AMF then selects one victim gNB that will send a RS to the aggressor gNBs, and invokes this victim gNB to transmit the RS which may be received by the aggressor gNBs, after which the communication proceeds as described herein.

In some embodiments, a group of aggressor gNBs situated in the same area receives the RS transmitted by the victim gNBs. Each aggressor gNB assembles its respective RIM coordination message and sends it over the backhaul to its respective AMF, i.e. aggressor AMF. The aggressor AMF aggregates these RIM coordination messages received from the aggressor gNBs and sends the aggregate RIM coordination message to the victims' AMF, after which the communication proceeds as described herein.

In some embodiments, one victim gNB collects all RIM coordination information received from other victim gNBs over the Xn interface instances and aggregates it into a single RIM coordination message and sends it to the victim AMF.

In some embodiments, the master aggressor gNB collects, from slave aggressor gNBs, the information about RS received from victim gNBs, and is responsible for RIM coordination communication to the aggressor AMF as e.g. in step 1 above.

In some embodiments, the aggressor AMF may setup a "lightweight" NG application protocol (NGAP) signaling connection to the victim gNB only to convey the RIM coordination messages.

In some embodiments, the aggressor gNB may setup a "lightweight" NGAP signaling connection to the victim AMF, only to convey the RIM coordination messages.

In some embodiments, the aggressor gNB may write the RIM coordination information into a database and send the address via backhaul to the victim gNBs.

For reference signal content included in RS, different identifiers are embedded into the RS. For example, the RS may contain an explicit identifier of the victims' AMF, e.g. AMF ID, AMF set ID, AMF region ID, or preconfigured index which can be a pointer to the AMF. In some embodiments, the RS may contain RSG ID, which implicitly points to the AMF affiliated to the victim gNBs.

In some embodiments, a mapping between RSG ID and the corresponding AMFs may be in the form of a mapping table stored at the aggressor AMFs. In some embodiments, the mapping may be retrieved by the aggressor AMF from a database, e.g. located in the core network. In some embodiments, the mapping may be configured in the AMF nodes by the operations and management (OAM) system.

In some embodiments, the RIM reference signal comprises two separate IDs, one AMF ID which directly or indirectly identifies the AMF associated with the victim gNB(s), and one RSG ID which is an identifier that may identify an individual or a group of gNBs associated with the AMF associated with the AMF ID.

The RSG ID may be allocated by the AMF to one or more of its associated gNB arbitrarily. Therefore, only a certain AMF may know the mapping of RSG ID to gNB IDs. When an aggressor gNB receives a RS with an AMF ID and RSG ID encoded into it, the aggressor gNB may transmit a message to its AMF over the backhaul, comprising these two IDs. The aggressor's AMF may then look up which AMF the AMF ID corresponds to, and send a message to that AMF comprising the RSG ID. Upon receiving such a message, the receiving AMF looks up which gNB(s) correspond to the RSG ID and forwards the message to the gNB(s).

In some embodiment, the AMF ID and the RSG ID may jointly constitute a RIM-RS ID. For example, a 16-bit RIM-RS ID may be divided so that the 6 MSBs constitute the AMF ID, while the 10 LSBs constitute the RSG ID. The RIM-RS ID may then, for example, be encoded into the reference signal transmission. For example, a 13-MSB RIM-RS ID may be encoded into the time resource whereon the RS is transmitted, such as the frame number and possibly additionally the slot or symbol within the frame. A 3-LSB RIM-RS ID may, for instance, be encoded in the choice of reference signal sequence. For example, a pseudo-noise (PN) sequence initialization seed may depend on the 3-LSB RIM-RS ID.

In some embodiment, the RIM coordination message may comprise a gNB ID for a source/destination address of a network node. Furthermore, the RIM coordination message may further comprise a RSG ID for the receiving network node, e.g., a gNB CU, to identify a recipient set of cells which are interfered, e.g., a victim network nodes. In some embodiments, the receiving network node may be a gNB or gNB-CU. A gNB CU manages a number of gNB DUs, and each gNB DU manages a number of cells. In some embodiments, the gNB CU may be a monolith gNB which manages a number of cells. When a RIM coordination message is sent from another gNB/gNB CU, the receiving gNB CU looks at the RSG ID, e.g., the destination set ID, checks its own records, and determines under which gNB-DUs are the cells that belong to the RSG ID. The receiving gNB CU may then forward the RIM coordination message to determined gNB-DUs.

Figure 11:
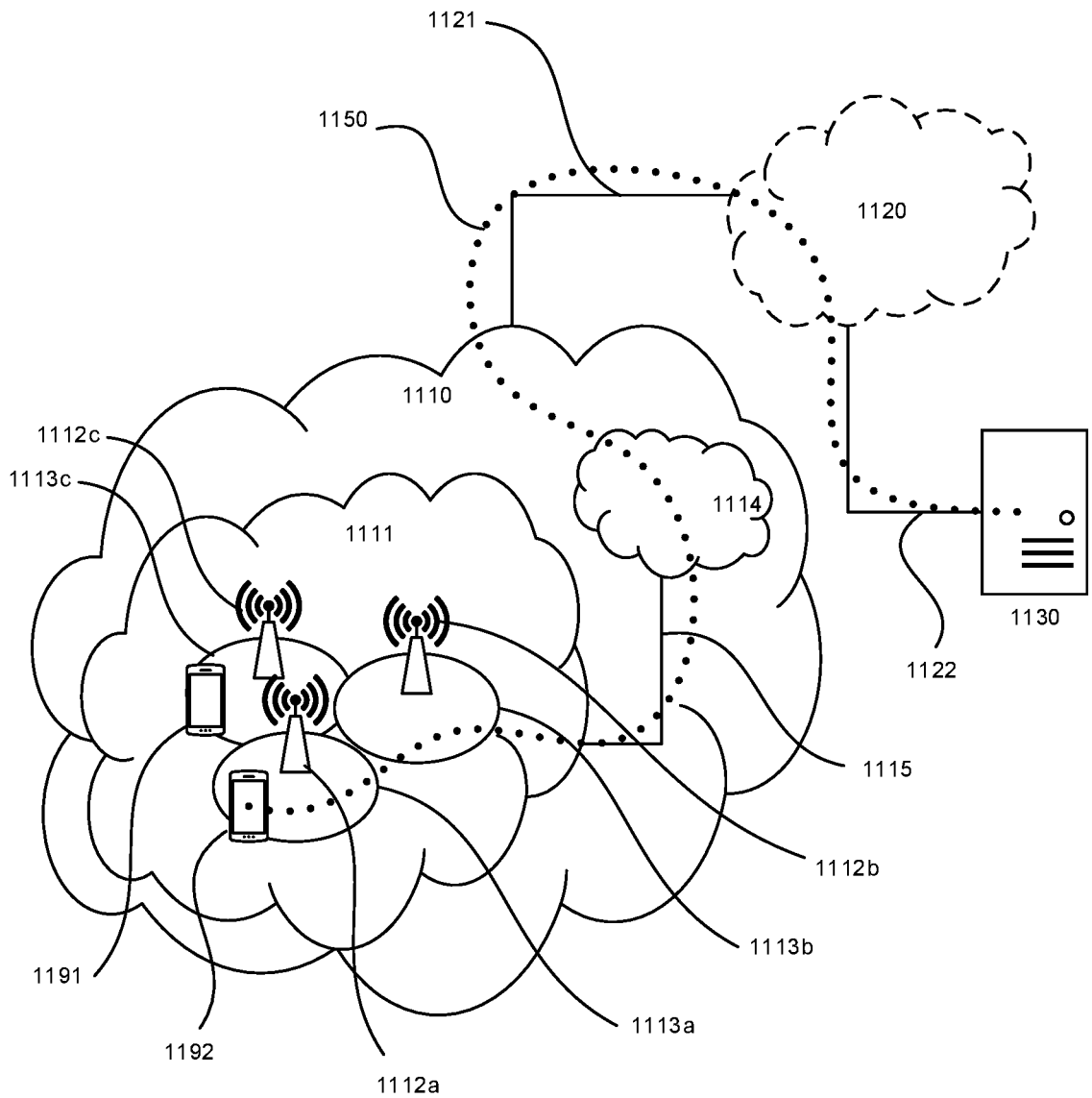
FIG. 11 illustrates an example telecommunication network connected via an intermediate network to a host computer, according to certain embodiments.

FIG. 11 illustrates an example telecommunication network connected via an intermediate network to a host computer, in accordance with certain embodiments. With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Figure 12:
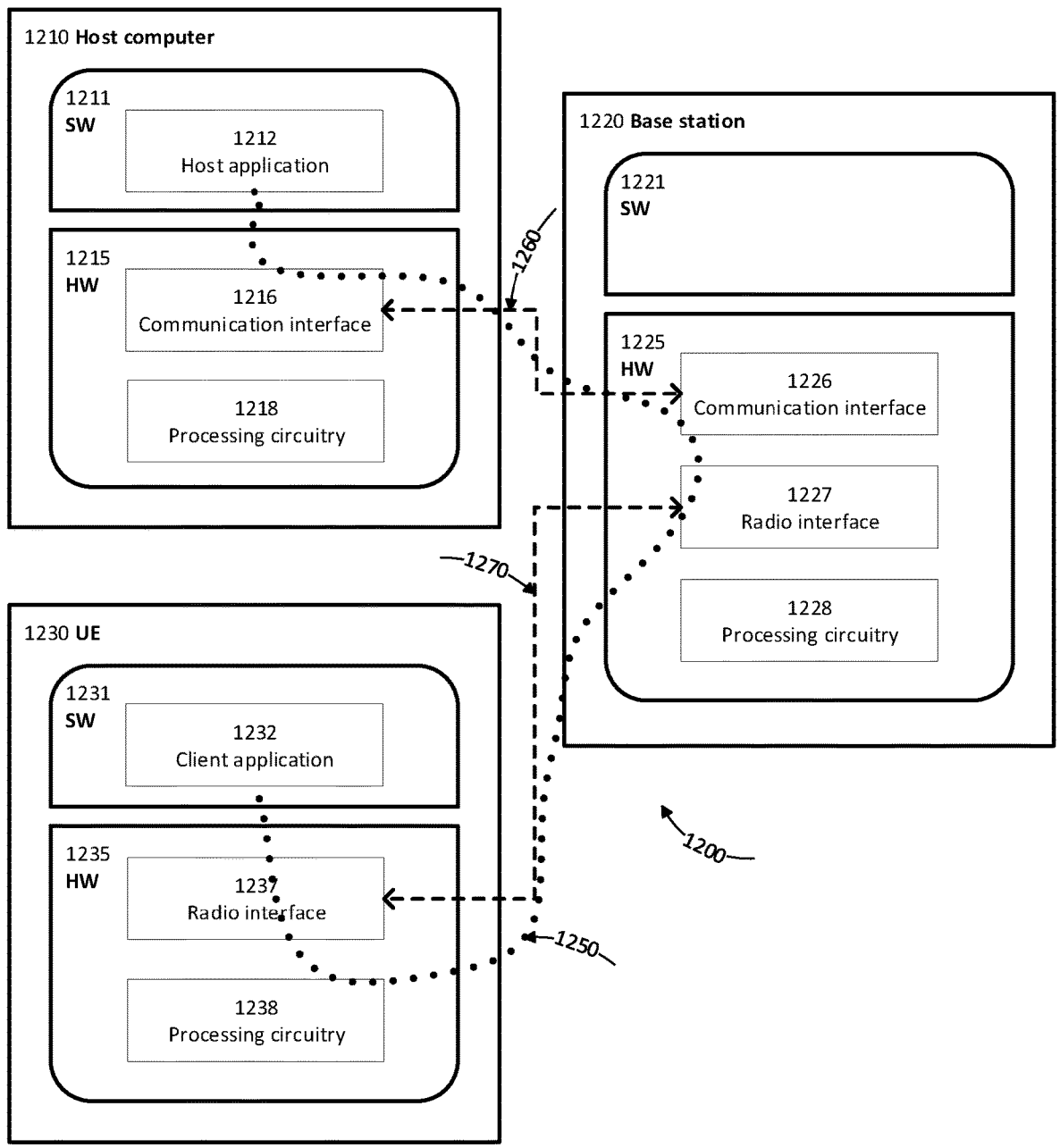
FIG. 12 illustrates an example host computer communicating via a base station with a user equipment over a partially wireless connection, according to certain embodiments.

FIG. 12 illustrates an example host computer communicating via a base station with a user equipment over a partially wireless connection, in accordance with certain embodiments. Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

It is noted that host computer 1210, base station 1220 and UE 1230 illustrated in FIG. 12 may be similar or identical to host computer 1130, one of base stations 1112*a*, 1112*b*, 1112*c* and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve the handling of redundant data in the transmit buffer and thereby provide benefits such as improved efficiency in radio resource use (e.g., not transmitting redundant data) as well as reduced delay in receiving new data (e.g., by removing redundant data in the buffer, new data can be transmitted sooner).

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figure 13:
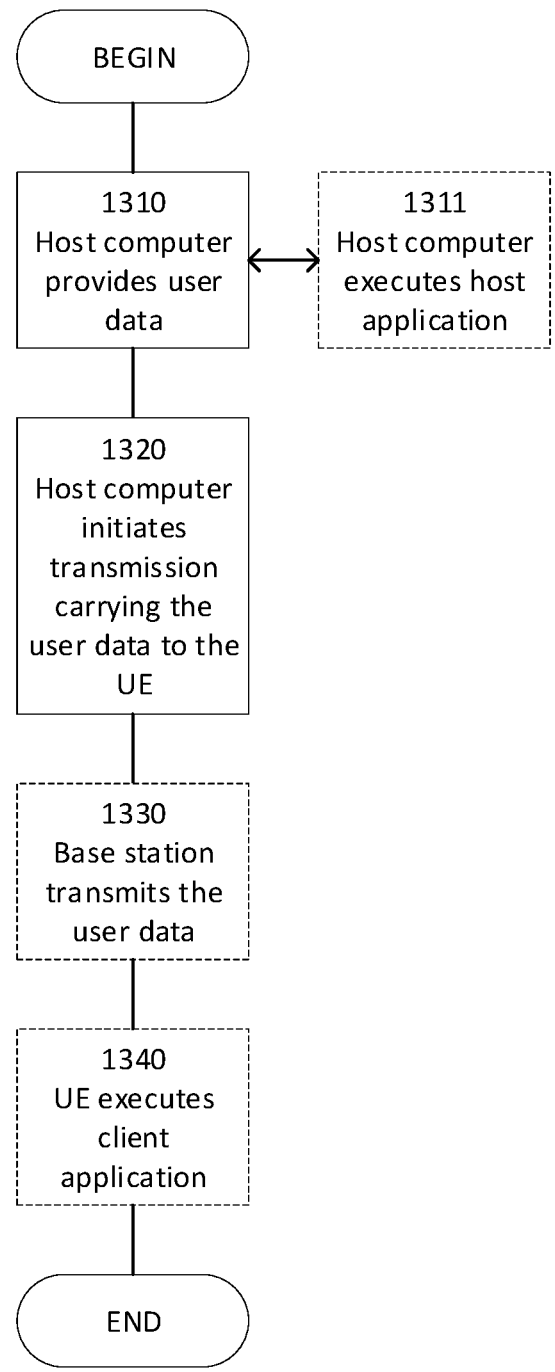
FIG. 13 illustrates an example method implemented in a communication system including a host computer, a base station and a user equipment, according to certain embodiments.

FIG. 13 illustrates an example method implemented in a communication system including a host computer, a base station and a user equipment, in accordance with certain embodiments. More specifically, FIG. 13 is a flowchart illustrating a method implemented in a communication system, in accordance with one embodiment. The communication system includes a host computer, a base station which may be a network node described with reference to FIG. 18. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

Figure 14:
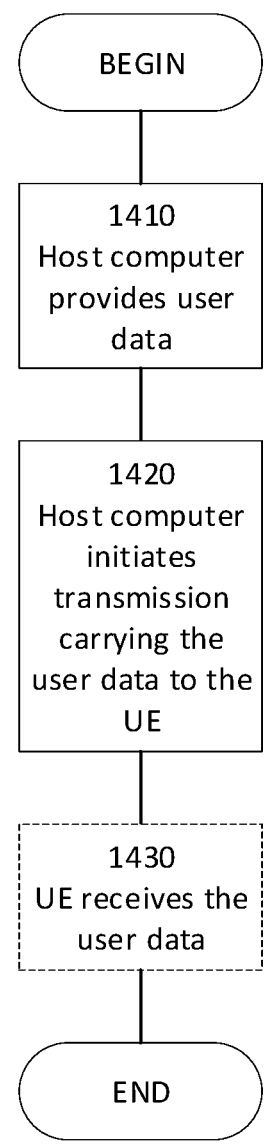
FIG. 14 illustrates another example method implemented in a communication system including a host computer, a base station and a user equipment, according to certain embodiments.

FIG. 14 illustrates an example method implemented in a communication system including a host computer, a base station and a user equipment, in accordance with some embodiments. More specifically, FIG. 14 is a flowchart illustrating a method implemented in a communication system, in accordance with one embodiment. The communication system includes a host computer, a base station which may be a network node described with reference to FIG. 18. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figure 15:
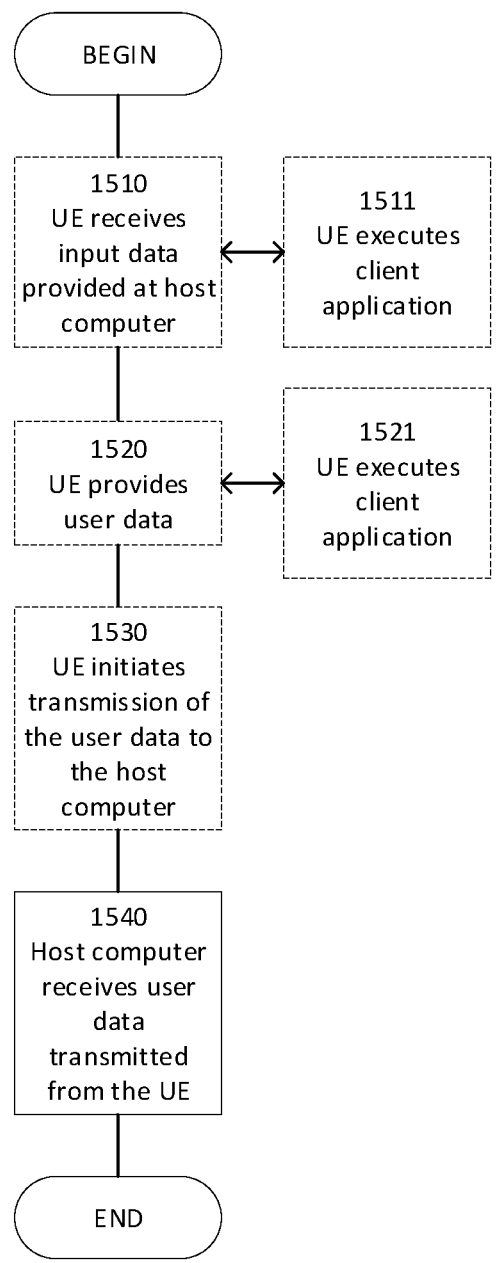
FIG. 15 illustrates another further example method implemented in a communication system including a host computer, a base station and a user equipment, according to certain embodiments.

FIG. 15 illustrates another further example method implemented in a communication system including a host computer, a base station and a user equipment, in accordance with certain embodiments. More specifically, FIG. 15 is a flowchart illustrating a method implemented in a communication system, in accordance with one embodiment. The communication system includes a host computer, a base station which may be a network node described with reference to FIG. 18. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

Figure 16:
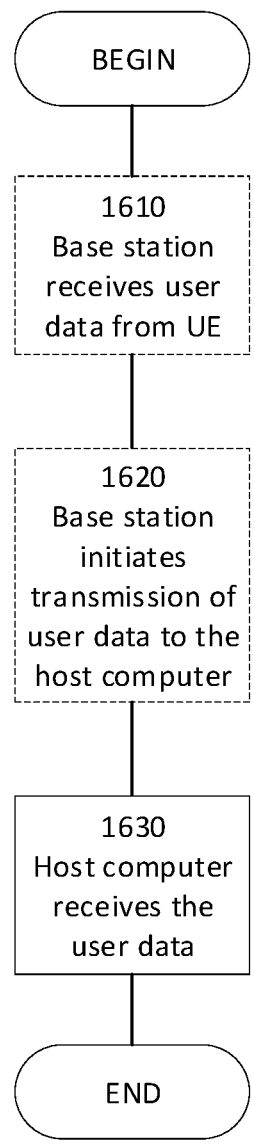
FIG. 16 illustrates another yet example method implemented in a communication system including a host computer, a base station and a user equipment, according to certain embodiments.

FIG. 16 illustrates another example method implemented in a communication system including a host computer, a base station and a user equipment, in accordance with certain embodiments. More specifically, FIG. 16 is a flowchart illustrating a method implemented in a communication system, in accordance with one embodiment. The communication system includes a host computer, a base station and a UE. In one embodiment, the base station may be a network node described with references to FIG. 18. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Figure 17:
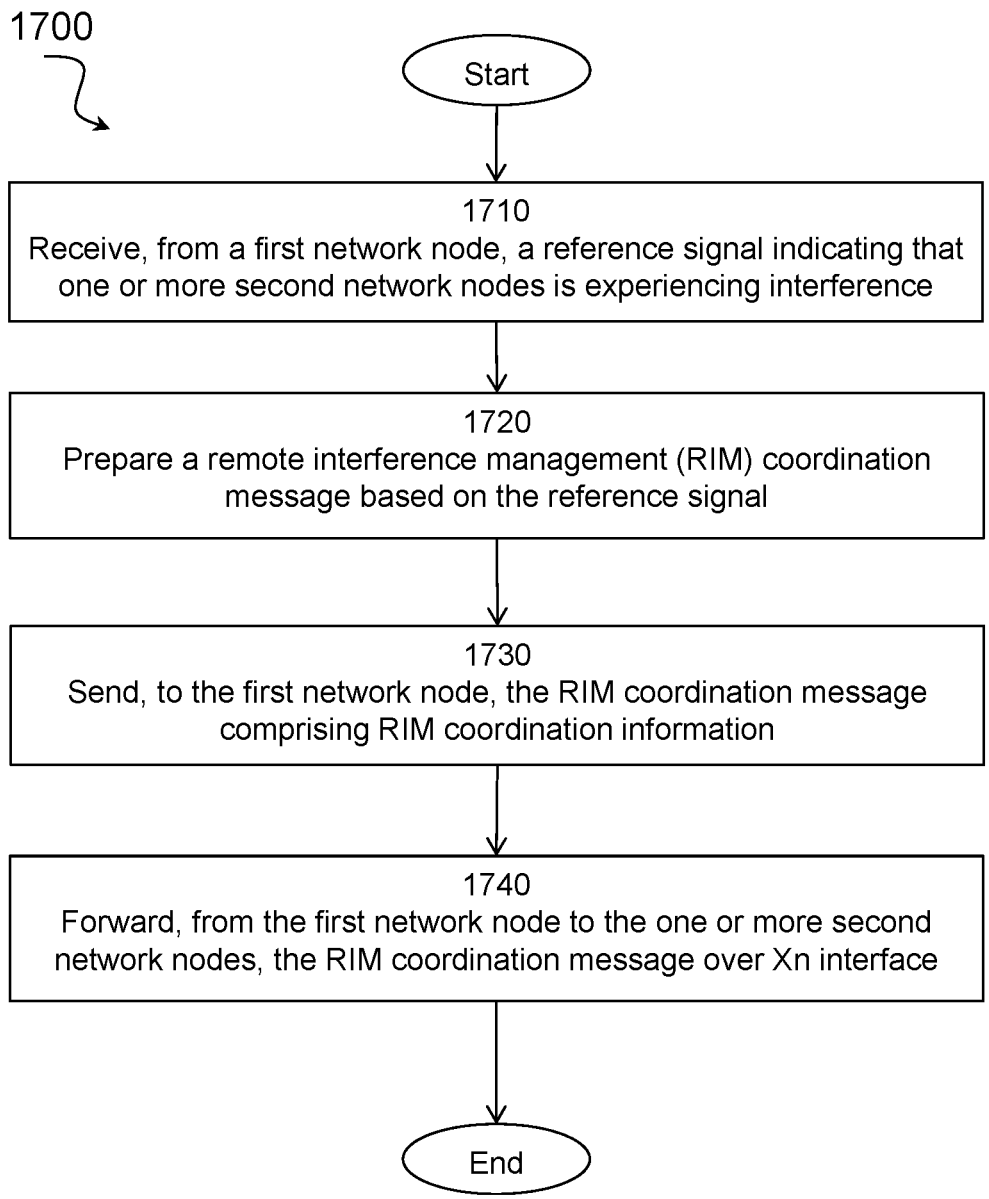
FIG. 17 illustrates a flow diagram of an example method performed at a network node, in accordance with certain embodiments.

FIG. 17 illustrates a flow diagram of an example method, in accordance with certain embodiments. The method may be performed by a network node. The network node may be the network node 460 depicted in FIG. 4. Method 1700 begins at step 1710 with receiving, from a first network node, a reference signal indicating that one or more second network nodes are experiencing interference. In some embodiments, the reference signal may indicate at least one identifier for the first network node and for the one or more second network nodes. In some embodiments, the one or more second network nodes may belong to a same reference signal group (RSG). In some embodiments, the first network node may be a central unit (CU) and the one or more second network nodes may be a group of distributed units (DUs). The first network node may be a master network node of the one or more second network nodes. In some embodiments, the first network node may an Access and Mobility Management Function (AMF) node. In some embodiments, the first network node and the one or more second network nodes may be victim network nodes.

At step 1720, the method 1700 prepares a remote interference management (RIM) coordination message based on the reference signal. In some embodiments, preparing the RIM coordination message may comprise transmitting, to a third network node, the RIM coordination message over backhaul, aggregating, at the third network node, the RIM coordination message transmitted over backhaul, and identifying, at the third network node, a first identifier for the first network node and a second identifier for the one or more second network nodes based on the reference signal. In some embodiments, the first identifier and the second identifier are included in the RIM coordination message aggregated at the third network node. In some embodiments, identifying the first identifier for the first network node and the second identifier for the one or more second network nodes may comprise retrieving, at the third network node, mapping information from a database in a core network. The mapping information comprises a mapping between the first identifier and the second identifier. In some embodiments, the second network node is an AMF node. In some embodiments, the second network node may be an aggressor network node. In some embodiments, the first identifier for the first network node may be an AMF ID, an AMF set ID, an AMF region ID, or a preconfigured index which indicates the first network node. In some embodiments, the second identifier for the one or more second network nodes may a RSG ID which identifies an individual network node or a group of network nodes associated with the first network node associated with the first identifier.

At step 1730, the method 1700 sends, to the first network node, the RIM coordination message to be forwarded to the one or more second network nodes. In some embodiments, the method 1700 may further forward, from the first network node to the one or more second network nodes, the RIM coordination message over Xn interface at step 1740. In some embodiments, sending the RIM coordination message may comprise establishing a connection with the first network node, sending the RIM coordination message to the first network node over backhaul, and forwarding the RIM coordination message to the one or more second network nodes via the Xn interface. In some embodiments, the connection may be a route via an intermediate network node in a core network.

Figure 18:
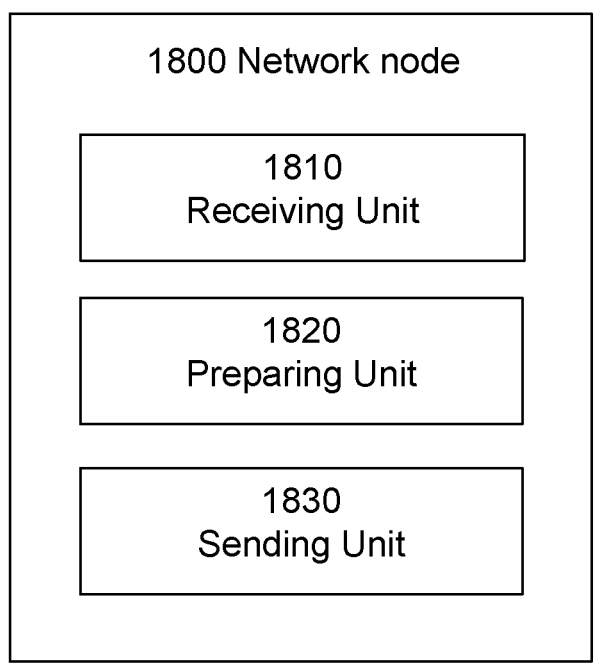
FIG. 18 illustrates a block schematic of an example network node, in accordance with certain embodiments.

FIG. 18 is a schematic block diagram of an exemplary network node 1800 in a wireless network, in accordance with certain embodiments. In some embodiments, the wireless network may be the wireless network 406 shown in FIG. 4. The network node may be the network node 460 shown in FIG. 4. The network node 1800 is operable to carry out the example method described with reference to FIG. 17 and possibly any other processes or methods disclosed herein. It is also to be understood that the methods in FIG. 17 is not necessarily carried out solely by the network node 1800. At least some operations of the method can be performed by one or more other entities.

Network node 1800 may comprise processing circuitry, which may include one or more microprocessor or microcontrollers, as well as other digital hardware, which may include digital signal processors (DSPs), special-purpose digital logic, and the like. In some embodiments, the processing circuitry of the network node 1800 may be the processing circuitry 470 shown in FIG. 4. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1810, preparing unit 1820, sending unit 1830, and any other suitable units of network node 1800 to perform corresponding functions according one or more embodiments of the present disclosure, such as a processor, a receiver, and a transmitter.

As illustrated in FIG. 18, the network node 1800 includes the receiving unit 1810, the preparing unit 1820, and the sending unit 1830. The receiving unit 1810 may be configured to receive, from a first network node, a reference signal indicating that one or more second network nodes are experiencing interference. In some embodiments, the reference signal may indicate at least one identifier for the first network node and for the one or more second network nodes. In some embodiments, the one or more second network nodes may belong to a same reference signal group (RSG). In some embodiments, the first network node may be a CU and the one or more second network nodes may be a group of DUs. The first network node may be a master network node of the one or more second network nodes. In some embodiments, the first network node may an AMF node. In some embodiments, the first network node and the one or more second network nodes may be victim network nodes.

The preparing unit 1820 may be configured to prepare a RIM coordination message based on the reference signal. In some embodiments, the preparing unit 1820 may be configured to transmit, to a third network node, the RIM coordination message over backhaul, aggregate, at the third network node, the RIM coordination message transmitted over backhaul, and identify, at the third network node, a first identifier for the first network node and a second identifier for the one or more second network nodes based on the reference signal. In some embodiments, the first identifier and the second identifier are included in the RIM coordination message aggregated at the third network node. In some embodiments, the preparing unit 1820 may further be configured to retrieve, at the third network node, mapping information from a database in a core network. The mapping information comprises a mapping between the first identifier and the second identifier. In some embodiments, the second network node is an AMF node. In some embodiments, the second network node may be an aggressor network node. In some embodiments, the first identifier for the first network node may be an AMF ID, an AMF set ID, an AMF region ID, or a preconfigured index which indicates the first network node. In some embodiments, the second identifier for the one or more second network nodes may a RSG ID which identifies an individual network node or a group of network nodes associated with the first network node associated with the first identifier.

The sending unit 1830 may be configured to send, to the first network node, the RIM coordination message to be forwarded to the one or more second network nodes. In some embodiments, the sending unit 1830 may be configured to establish a connection with the first network node, send the RIM coordination message to the first network node over backhaul, and forward the RIM coordination message to the one or more second network nodes via a Xn interface. In some embodiments, the connection may be a route via an intermediate network node in a core network.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

According to various embodiments, an advantage of features herein is that a central network node may coordinate reference signals from its group of network nodes and communicate with another central network node via the backhaul to exchange the reference signals and the RIM-related message, such that a large signaling load in the network can be avoided. In addition, another advantage of features herein is that providing a scalable solution specific to the interferences caused by an aggressor network node in the distance. Particular embodiments of the present application allow the central network node to identify its group of network nodes based on the identifier included in the RIM-related messages, such that the central network node may then forward the RIM-related message to the identified network nodes to improve network performance.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for interference coordination, comprising:
receiving, from a first network node, a reference signal indicating that one or more second network nodes are experiencing interference, wherein the reference signal indicates at least one identifier for the first network node and for the one or more second network nodes;
preparing a remote interference management (RIM) coordination message based on the reference signal;
transmitting, to a third network node, the RIM coordination message over backhaul;
aggregating, at the third network node, the RIM coordination message transmitted over backhaul;
identifying, at the third network node, a first identifier for the first network node and a second identifier for the one or more second network nodes based on the reference signal, wherein the first identifier and the second identifier are included in the RIM coordination message aggregated at the third network node; and sending, to the first network node, the RIM coordination message to be forwarded to the one or more second network nodes.

2. The method according to claim 1, wherein the first network node is a central unit and the one or more second network nodes are a group of distributed units.

3. The method according to claim 1, wherein the first network node is an Access and Mobility Management Function (AMF) node.

4. The method according to claim 1, wherein sending the RIM message comprises:
establishing a connection with the first network node;
sending the RIM coordination message to the first network node over backhaul; and
forwarding the RIM coordination message to the one or more second network nodes via a Xn interface.

5. The method according to claim 4, wherein the connection is a route via an intermediate network node in a core network.

6. The method according to claim 1, wherein identifying the first identifier for the first network node and the second identifier for the one or more second network nodes comprises:
retrieving, at the third network node, mapping information from a database in a core network, wherein the mapping information comprises a mapping between the first identifier and the second identifier.

7. The method according to claim 1, wherein the third network node is an AMF node.

8. The method according to claim 1, wherein the first identifier for the first network node is an AMF identifier (ID), an AMF set ID, an AMD region ID, or a preconfigured index which indicates the first network node.

9. The method according to claim 1, wherein the second identifier for the one or more second network nodes is a reference signal group (RSG) ID which identifies an individual network node or a group of network nodes associated with the first network node associated with the first identifier.

10. A network node for positioning reference signal configuration, comprising:
at least one processing circuitry; and
at least one storage that stores processor-executable instructions, when executed by the processing circuitry, causes a network node to:
receive, from a first network node, a reference signal indicating that one or more second network nodes are experiencing interference, wherein the reference signal indicates at least one identifier for the first network node and for the one or more second network nodes;
prepare a remote interference management (RIM) coordination message based on the reference signal;
transmit, to a third network node, the RIM coordination message over backhaul;
aggregate, at the third network node, the RIM coordination message transmitted over backhaul;
identify, at the third network node, a first identifier for the first network node and a second identifier for the one or more second network nodes based on the reference signal, wherein the first identifier and the second identifier are included in the RIM coordination message aggregated at the third network node; and
send, to the first network node, the RIM coordination message to be forwarded to the one or more second network nodes.

11. The network node according to claim 9, wherein the first network node is a central unit and the one or more second network nodes are a group of distributed units.

12. The network node according to claim 10, wherein the first network node is an Access and Mobility Management Function (AMF) node.

13. The network node according to claim 10, wherein sending the RIM message comprises:
establishing a connection with the first network node; and
sending the RIM coordination message to the first network node over backhaul, wherein the RIM coordination message is further to be forwarded to the one or more second network nodes via a Xn interface.

14. The network node according claim 13, wherein the connection is a route via an intermediate network node in a core network.

15. The network node according to claim 10, wherein identifying the first identifier for the first network node and the second identifier for the one or more second network nodes comprises:
retrieving, at the third network node, mapping information from a database in a core network, wherein the mapping information comprises a mapping between the first identifier and the second identifier; and
sending, from the third network node to the first network node, the RIM coordination message.

16. The network node according to claim 10, wherein the third network node is an AMF node.

17. The network node according to claim 10, wherein the first identifier for the first network node is an AMF identifier (ID), an AMF set ID, an AMF region ID, or a preconfigured index which indicates the first network node.

18. The network node according to claim 10, wherein the second identifier for the one or more second network nodes is a reference signal group (RSG) ID which identifies an individual network node or a group of network nodes associated with the first network node associated with the first identifier.

* * * * *

UNITED STATES PATENT AND TRADEMARK OFFICE
CERTIFICATE OF CORRECTION

| | | |
|---|---|---|
| PATENT NO. | : 12,021,789 B2 | Page 1 of 1 |
| APPLICATION NO. | : 17/275190 | |
| DATED | : June 25, 2024 | |
| INVENTOR(S) | : Barac et al. | |

It is certified that error appears in the above-identified patent and that said Letters Patent is hereby corrected as shown below:

In the Specification

In Column 1, Line 5, delete "PCT/162019/057629," and insert -- PCT/IB2019/057629, --, therefor.

In Columns 5 & 6, in TABLE 2-continued, Line 9, delete "d1-UL-TransmissionPeriodicity" and insert -- dl-UL-TransmissionPeriodicity --, therefor.

In the Claims

In Column 36, Line 15, in Claim 11, delete "claim 9," and insert -- claim 10, --, therefor.

Signed and Sealed this
Twenty-second Day of April, 2025

Coke Morgan Stewart
*Acting Director of the United States Patent and Trademark Office*